United States Patent [19]
Snyder

[11] Patent Number: 6,101,428
[45] Date of Patent: Aug. 8, 2000

[54] AUTO REMOTE CONTROL WITH SIGNAL STRENGTH DISCRIMINATION

[75] Inventor: Douglas D. Snyder, Bergholz, Ohio

[73] Assignee: Jon Snyder, Inc., Wintersville, Ohio

[21] Appl. No.: 09/322,969

[22] Filed: May 28, 1999

Related U.S. Application Data

[60] Provisional application No. 60/087,174, May 29, 1998.

[51] Int. Cl.[7] .............................. G05D 1/00; G05D 3/00; G06F 7/00; G06F 17/00
[52] U.S. Cl. ................................. 701/2; 701/36; 701/45; 701/49; 701/53; 701/115; 340/500; 340/901; 340/425.5; 70/256; 74/10 A; 381/86
[58] Field of Search .................................... 701/2, 36, 45, 701/49, 53, 115; 340/500, 901, 425.5; 70/256; 74/10 A; 381/86

[56] References Cited

U.S. PATENT DOCUMENTS

| | | | |
|---|---|---|---|
| 4,719,460 | 1/1988 | Takeuchi et al. | 340/825.31 |
| 5,638,270 | 6/1997 | Maeda et al. | 701/1 |
| 5,705,975 | 1/1998 | Serino et al. | |
| 5,734,330 | 3/1998 | Nakamura | 340/825.31 |
| 5,769,051 | 6/1998 | Bayron et al. | 123/335 |
| 5,783,994 | 7/1998 | Koopman, Jr. et al. | 340/539 |
| 5,796,178 | 8/1998 | Onuma | 307/10.2 |
| 5,933,090 | 8/1999 | Chistenson | 340/825.69 |

Primary Examiner—William A. Cuchlinski, Jr.
Assistant Examiner—Olga Hernandez
Attorney, Agent, or Firm—Wood, Herron & Evans, L.L.P.

[57] ABSTRACT

A remote control system which determines which of at least two different vehicle functions to activate based at least in part on the strength of the received signal. In a first alternative embodiment, a strong received signal unlocks the door, whereas a weak received signal causes the engine to start. Thus, using the same signal the driver can start the engine of the vehicle while a distance from the vehicle, and subsequently unlock the door when the driver has walked near to the vehicle. In a second alternative embodiment, the signal to unlock the door is relatively weak when transmitted, whereas the signal to start the engine is relatively strong when transmitted, so that the engine can be started from a distance, but the doors can only be unlocked when the transmitter is near to the vehicle. The security of the vehicle is thereby enhanced, and the ease of use of the remote control system is increased.

33 Claims, 5 Drawing Sheets

AUTO REMOTE CONTROL WITH SIGNAL STRENGTH DISCRIMINATION

This application is based on a provisional application 06/087,174 filed on May 29, 1998.

FIELD OF THE INVENTION

The present invention relates to remote controllers for vehicles for starting the engine, unlocking the doors, and the like.

BACKGROUND OF THE INVENTION

Remote control units for controlling functions of vehicles are well known. Currently, the original equipment for many vehicles includes a wireless transmitter for arming/disarming the car alarm and/or locking or unlocking the car doors. Furthermore, aftermarket systems are available including wireless transmitters and receivers for controlling these and other functions, such as energizing the car starter to start the engine, so that the car will be warm or cool by the time the driver arrives.

Remote control transmitters which control multiple vehicle functions typically are configured to transmit control signals on different frequencies or to produce differently coded or modulated radio signals, each signal identifying the controlled function. The driver selects the desired function by pressing the associated button on the transmitter keypad, and the transmitter responds by transmitting the appropriate signal and/or code. For security purposes, transmitters controlling only a single function also often modulate or code their signal for security purposes, so that the vehicle will ignore signals which are not modulated or coded with a predetermined code assigned to the vehicle.

A difficulty with these systems is that the driver specifically selects which function to activate, which can lead to security failures. For example, the driver may unintentionally unlock the doors to the vehicle after it has been started, when the driver is a relatively long distance from the vehicle. Under these conditions it is possible that the vehicle might be stolen before the driver arrives at the vehicle. This problem can be avoided by reducing the transmitter power so that it has a limited range, but this solution has the accompanying problem that the driver may wish to be able to activate some functions, e.g., starting the engine, from a great distance from the vehicle, e.g. while the driver is inside of a shopping mall and the vehicle is parked outside.

SUMMARY OF THE INVENTION

In accordance with the present invention, these difficulties with prior remote control systems for vehicles are avoided by a remote control system which uses signal strength, instead of or in addition to frequency or coding, to discriminate between remote control signals.

In one aspect, the remote control signal receiver determines which of at least two different vehicle functions to activate, and/or whether to activate a vehicle function, based at least in part on the strength of the received signal. A strong received signal indicates a relatively short distance between the transmitter and receiver, whereas a weak received signal indicates a relatively large distance between the transmitter and receiver. The receiver determines the signal strength as well as any other features of the signal, and then takes the appropriate action based on the signal strength. For example, the receiver may activate a different vehicle function in response to a strong signal than in response to a weak version of the same signal. Alternatively, the receiver may not activate a vehicle function unless the signal is strong, or alternatively, may not activate a vehicle function unless the signal is weak.

Where the strength of the signal is used to determine which of two functions to activate, the two functions being controlled may be unlocking a door of the vehicle and starting the vehicle engine. A strong received signal unlocks the door, whereas a weak received signal causes the engine to start. Thus, using the same signal the driver can start the engine of the vehicle while a distance from the vehicle, and subsequently unlock the door when the driver has walked near to the vehicle. This substantially reduces the risk that the driver will accidentally start the vehicle and unlock the doors while the driver is a large distance from the vehicle; the vehicle can be started while the driver is a long distance from the vehicle, but the doors cannot be unlocked until the driver and transmitter are relatively close to the vehicle and the signal strength from the transmitter has been suitably increased.

In an alternative aspect, the remote control transmitter transmits signals of different strengths when activating either of at least two different vehicle functions. A strong signal, which can be received a relatively large distance from the transmitter, is transmitted to activate functions which can be safely activated a large distance from the vehicle (e.g., starting the engine, arming the alarm, locking the doors). A weak signal, which can be received only a relatively short distance from the transmitter, is transmitted to activate functions which should only be activated a short distance from the vehicle (e.g., disarming the alarm, unlocking the doors).

In the particular disclosed embodiment of this aspect, a strong signal is transmitted for functions such as arming the alarm, locking the doors, and starting the vehicle engine. A weak signal is transmitted for functions such as unlocking the door, and disarming the alarm. Thus, the driver can start the engine of the vehicle while a distance from the vehicle, but cannot unlock the door until the driver has walked near to the vehicle. This substantially reduces the risk that the driver will accidentally start the vehicle and unlock the doors while the driver is a large distance from the vehicle; the vehicle can be started while the driver is a long distance from the vehicle, but the doors cannot be unlocked until the driver and transmitter are relatively close to the vehicle and the weak signal generated by the transmitter can be received.

In alternative embodiments, the functions being controlled may include any of locking or unlocking vehicle doors, starting the vehicle's engine, arming or disarming the vehicle's alarm system, activating a panic alarm, generating a signal to aid in locating the vehicle (such as by flashing the lights or briefly honking the horn), or activating electrically powered features of the vehicle such as a power window or sunroof.

The transmitted signal may include one or more modulated codes, such as a security code and function code, for identifying the transmitter for security purposes, and for identifying functions being activated by the driver. In this case, the codes are generated by the transmitter and evaluated by the receiver, to identify the vehicle (e.g., the security code must match a predetermined code assigned to the vehicle), and the vehicle function to be activated.

Thus, by including variation of the strength of a remote control signal in the generation and evaluation of that signal at the transmitter and receiver, various functions and function combinations can be achieved that have not previously been possible. Furthermore, the security of the vehicle can be enhanced, and the apparent "intelligence" of the remote control system is increased while simultaneously potentially reducing the number of buttons or controls on the transmitter, reducing complexity and cost and improving reliability.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
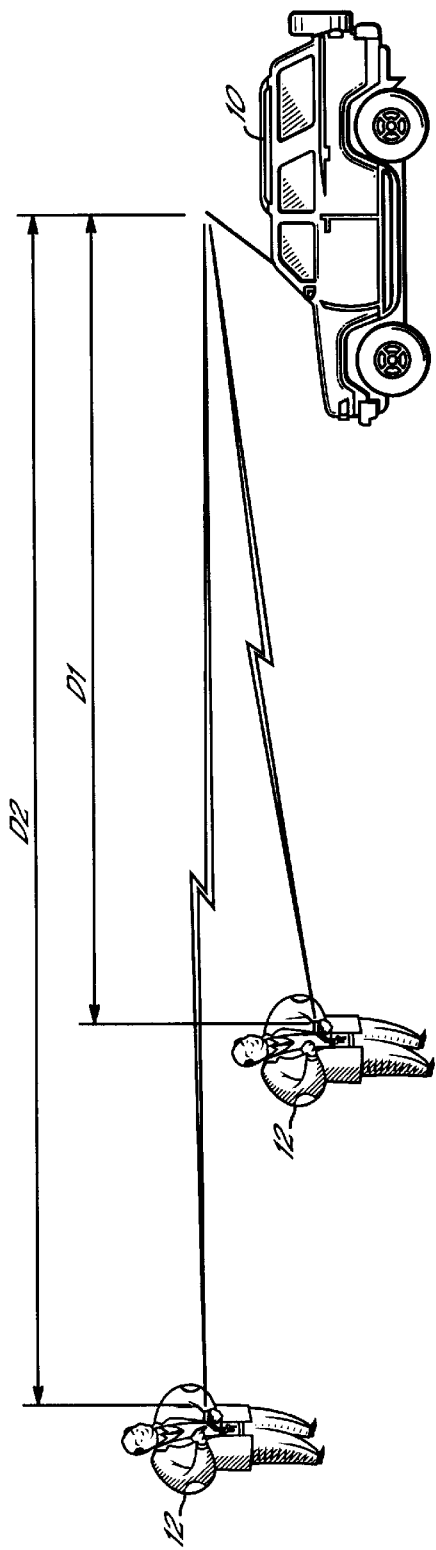
FIG. 1 is a diagram illustrating a vehicle responding to a transmitted signal from a distant driver, and to a transmitted signal from a nearby driver.

Referring to FIG. 1, a remote control system in a vehicle 10, can be activated by the vehicle driver 12 when positioned a first distance D1 from the vehicle, or alternatively when a second greater distance D2 from the vehicle. The maximum distance from which the remote control signal can be transmitted is a function of the frequency and transmitting power used by the system, but can be as great as one-half mile for a 900 MHZ transmitting frequency at normal FCC-approved power output levels.

In accordance with the first aspect of the present invention, the remote control system in vehicle 10 evaluates the strength of the remote control signal received from the driver to determine whether it is a relatively strong or weak signal, and takes the appropriate action based upon whether the signal is determined to be strong or weak. For example, a relatively strong signal received from the driver when at the distance D1 from the vehicle, which may be approximately one hundred feet, may cause the vehicle to unlock its doors. A relatively weak signal received from the driver when at the distance D2 from the vehicle, which may be as great as one-half mile, may cause the vehicle start its engine.

In accordance with the second aspect of the present invention, the transmitting power used by the transmitter may be to transmit different functions. For example, a full power signal may be transmitted for some functions, and a reduced power signal may be transmitted for other functions. This will prevent transmissions for some functions from being received by the receiver in vehicle 10 when the user is a large distances such as D2.

Figure 2:
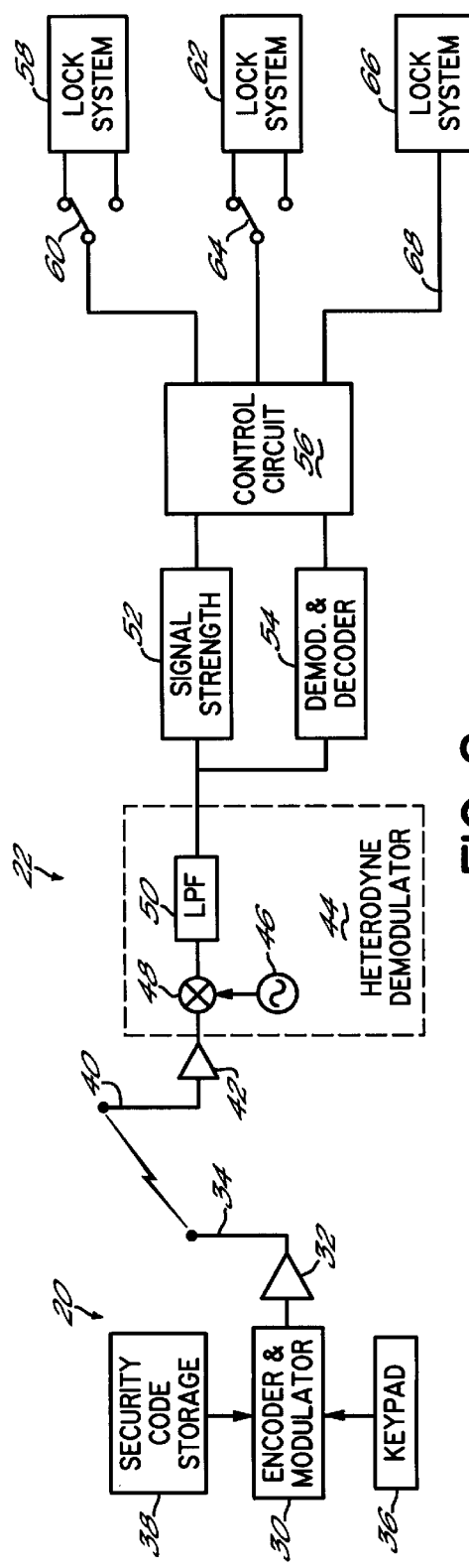
FIG. 2 is a block diagram of a remote control transmitter and receiver in accordance with an embodiment of the present invention.

FIG. 2 illustrates the functional components of the transmitter 20 and receiver 22 which comprise the remote control system in one embodiment of the present invention. Transmitter 20 comprises an encoder and modulator 30 for encoding a remote control signal and modulating this signal with an appropriately selected carrier frequency, e.g., 900 MHZ. The resulting encoded signal is amplified by an amplifier 32 and delivered to a transmission antenna 34 for wireless transmission. The amplification power utilized by amplifier 32 may be fixed at a maximum power permitted by the FCC, or may be variable in accordance with the second aspect of the present invention.

A keypad 36 is connected to the encoder and modulator 32 for activating the encoder and modulator to transmit a remote control signal. The keypad 36 may comprise a single key or button, which when depressed causes the same coded signal to be transmitted. Alternatively, keypad 36 may comprise a number of keys or buttons for selecting different functions. In this case, the encoder and modulator 30 receives an indication of the button or key that was depressed and encodes a corresponding function code into the signal delivered for transmission to amplifier 32.

Transmitter 20 further comprises a security code storage device 38, which may be a memory device storing a security code, or a series of switches that are programmed with the security code. The security code stored in security code storage device 38 is delivered to encoder and modulator 30 where it is married to a function code derived from the key or button depressed on keypad 36, and the resulting encoded signal is delivered to amplifier 32 for transmission.

The receiver 22 comprises a receiver section including an antenna 40 and an amplifier 42 for amplifying signals received from antenna 40. Amplified signals are then delivered to a first demodulation stage 44, which may comprise a heterodyne demodulator for shifting the carrier frequency of the transmitted signal to a baseband for demodulation and decoding. Demodulation stage 44 comprises a frequency source 46 at approximately the carrier frequency. The output of frequency source 46 is mixed in mixer 48 with the amplified received signal from antenna 40, and the resulting output from mixer 48 is delivered to a low pass filter 50. The output from low pass filter 50 thus comprises a frequency-translated version of the transmitted signal from transmitter 20.

The output of demodulation stage 44 (which comprises the output of low pass filter 50) is fed to a signal strength detection circuit 52 as well as a demodulator and decoder circuit 54. Signal strength circuit 52 compares the peak-to-peak or RMS amplitude of the output of demodulation stage 44 to one or more thresholds. A single threshold may be used to determine whether a valid signal has been received. In this case, signals exceeding the threshold, either at any point in time or over a period of time, may be considered valid. Dual thresholds may be used to identify the demodulated signal as, for example, either a lower strength valid signal, or a higher strength valid signal. Alternatively, three or more thresholds may be established by signal strength circuit 52, so that received valid signals are identified as within three or more categories of signal strength. A signal indicating receipt of a valid signal, and where applicable, an indication of the category of signal strength of the received signal, is delivered at the output of signal strength circuit 52.

Demodulator and decoder circuit 54 processes the received signal from demodulation stage 44 to determine the security code and function code modulated into the signal. These codes are delivered at the output of demodulator and decoder circuit 54.

A control circuit 56, which may comprise a microprocessor or discrete or application-specific logic circuits, receives the valid signal and signal strength category signal from signal strength circuit 52 and the security and function codes from demodulator and decoder circuit 54, and uses these signals to determine whether a valid signal was received, and whether and what vehicle functions to activate in response to a valid received signal.

Control circuit 56 is connected to various functional elements of the vehicle. The power lock system 58 of the vehicle is activated to lock or unlock the vehicle doors through one or more switches 60. The vehicle starter 62 is activated through a switch 64. The vehicle alarm system 66 is armed, disarmed, activated in a "panic" mode and/or activated in a "vehicle location signaling" mode (which may involve flashing the vehicle's lights or honking the vehicle's horn), by control signals transmitted over one or more signal lines 68.

Figure 3A:
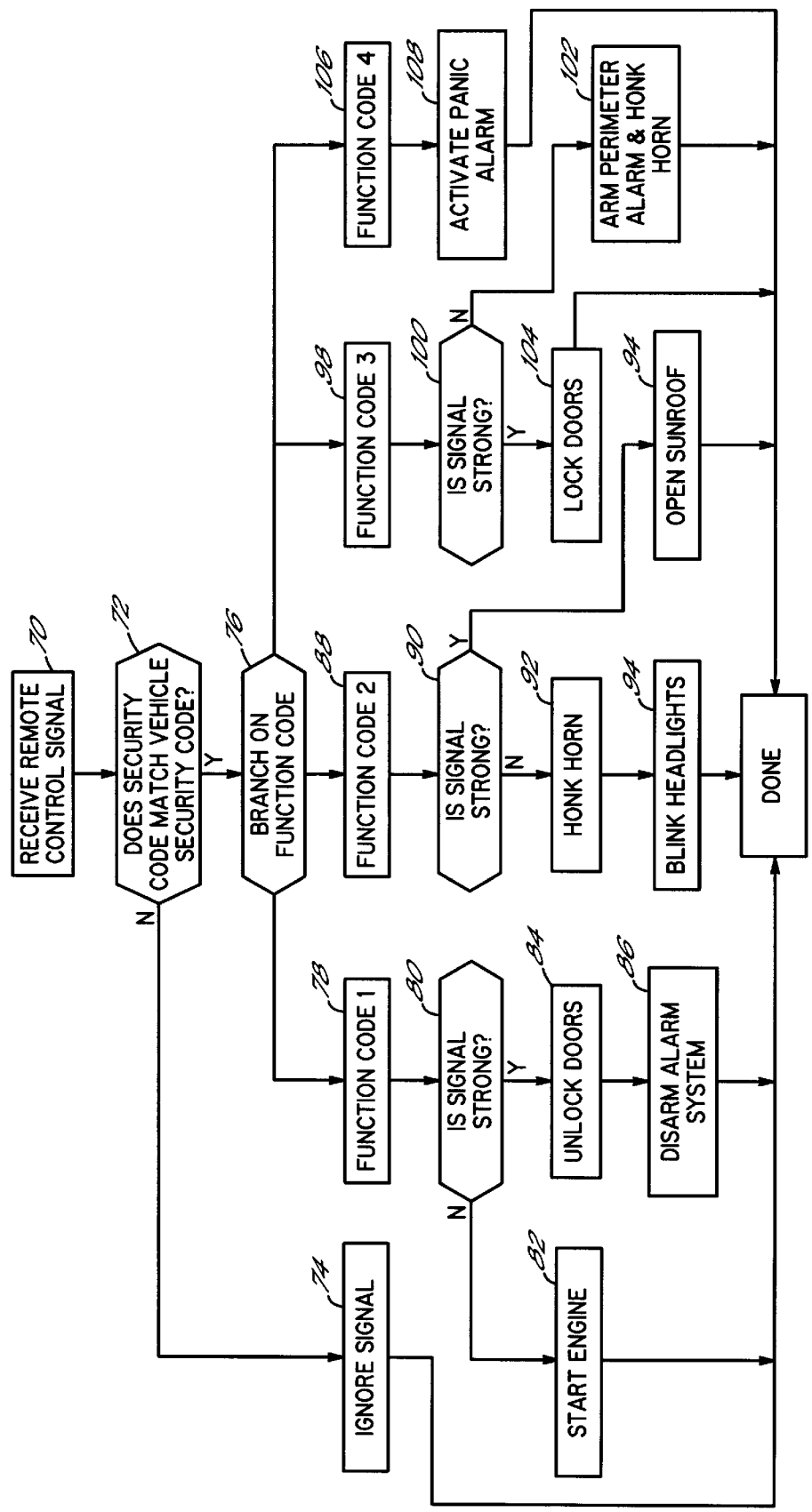
FIG. 3A is a flow chart of operations performed by the receiver of the remote control system of FIG. 2 in response to receipt of a wireless remote control signal, in accordance with a first embodiment of the present invention.

Referring now to FIG. 3A, the operations of control circuit 56 in activating these various vehicle systems, in accordance with the first aspect of the present invention, are illustrated in more detail. Upon receipt 70 of a valid remote control signal, control circuit 56 initially determines 72 whether the security code in the received signal matches the security code of the vehicle. The vehicle security code may be programmed into control circuit 56 via a memory device or by switches selectable by the user.

If the transmitted signal's security code does not match the vehicle's security code, then the signal is ignored 74. If, however, the security code matches, then the function code in the transmit signal is evaluated 76 to determine the appropriate action to take.

If the function code has a first value 78, then the control circuit 56 determines 80 whether the received signal is a strong or weak signal. If the received signal is a weak signal, then control circuit 56 starts 82 the vehicle's engine. If the received signal is a strong signal, then control circuit 56 activates the door lock system 58 to unlock 84 the vehicle's doors, and disarms 86 the vehicle's alarm system 66.

If the function code has a second value 88, then the control circuit 56 determines 90 whether the received signal is a strong or weak signal. If the received signal is a weak signal, then control circuit 56 causes the alarm circuit 66 to signal the vehicle's location by honking 92 the vehicle's horn and blinking 94 the vehicle's headlights. If the received signal is a strong signal, then control circuit 56 activates the door lock system 58 to open 96 the vehicle's sunroof.

If the function code has a third value 98, then the control circuit 56 determines 100 whether the received signal is a strong or weak signal. If the received signal is a weak signal, then control circuit 56 causes the alarm system 66 to arm 102 the vehicle's perimeter alarm system, and honk the horn to confirm arming of the alarm system. If the received signal is a strong signal, then control circuit 56 activates the door lock system 58 to lock 104 the vehicle's doors.

If the function code has a fourth value 106, then the control circuit 56 activates 108 the alarm system 66 in a "panic" mode.

Figure 3B:
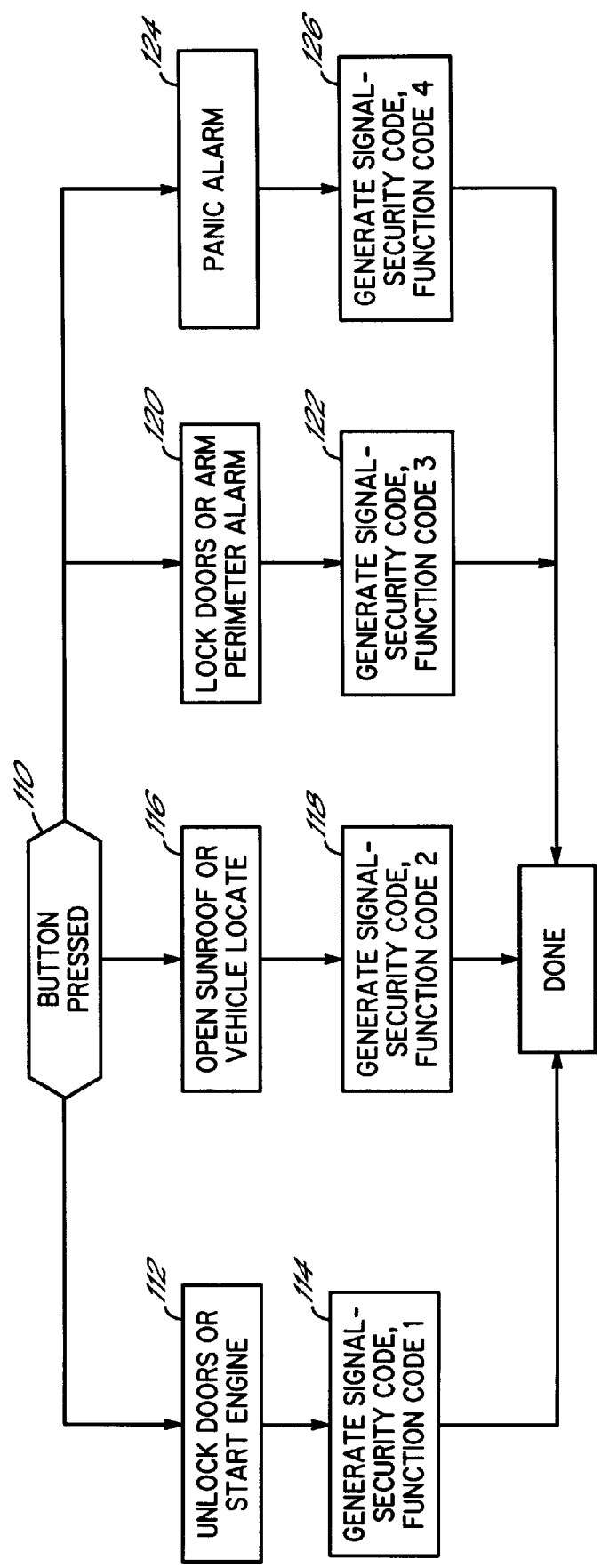
FIG. 3B is a flow chart of operations performed by the transmitter of the remote control system of FIG. 2 generating a wireless remote control signal in accordance with the first embodiment of the present invention.

Referring now to FIG. 3B, in accordance with this first aspect of the invention, the remote control transmitter 20 includes dual-function buttons in keypad 36. Furthermore, in all cases transmitter 20 generates a full power output signal. Thus, when a button is pressed 110, the transmitter 20 determines which button was pressed and takes the appropriate action.

If the start engine/unlock doors button was pressed 112, then a signal is generated 114 which includes the vehicle security code and the first function code value. If transmitter 20 is distant from the vehicle and this signal is weak when received at the vehicle 10, then in accordance with FIG. 3A the vehicle 10 will start its engine upon receipt of this signal; if the transmitter 20 is not so distant, then the vehicle 10 will unlock its doors in response to this signal.

If the open sunroof/vehicle locate button was pressed 116, then a signal is generated 118 which includes the vehicle security code and the second function code value. If transmitter 20 is distant from the vehicle and this signal is weak when received at the vehicle 10, then in accordance with FIG. 3A the vehicle 10 will honk its horn and flash its headlights upon receipt of this signal; if the transmitter 20 is not so distant, then the vehicle 10 will open its sunroof in response to this signal.

If the lock doors/arm alarm button was pressed 120, then a signal is generated 122 which includes the vehicle security code and the third function code value. If transmitter 20 is distant from the vehicle and this signal is weak when received at the vehicle 10, then in accordance with FIG. 3A the vehicle 10 will arm its alarm upon receipt of this signal; if the transmitter 20 is not so distant, then the vehicle 10 will lock its doors in response to this signal.

If the panic alarm button was pressed 124, then a signal is generated 126 which includes the vehicle security code and the fourth function code value. In accordance with FIG. 3A, the vehicle 10 respond by sounding a panic alarm.

Figure 3C:
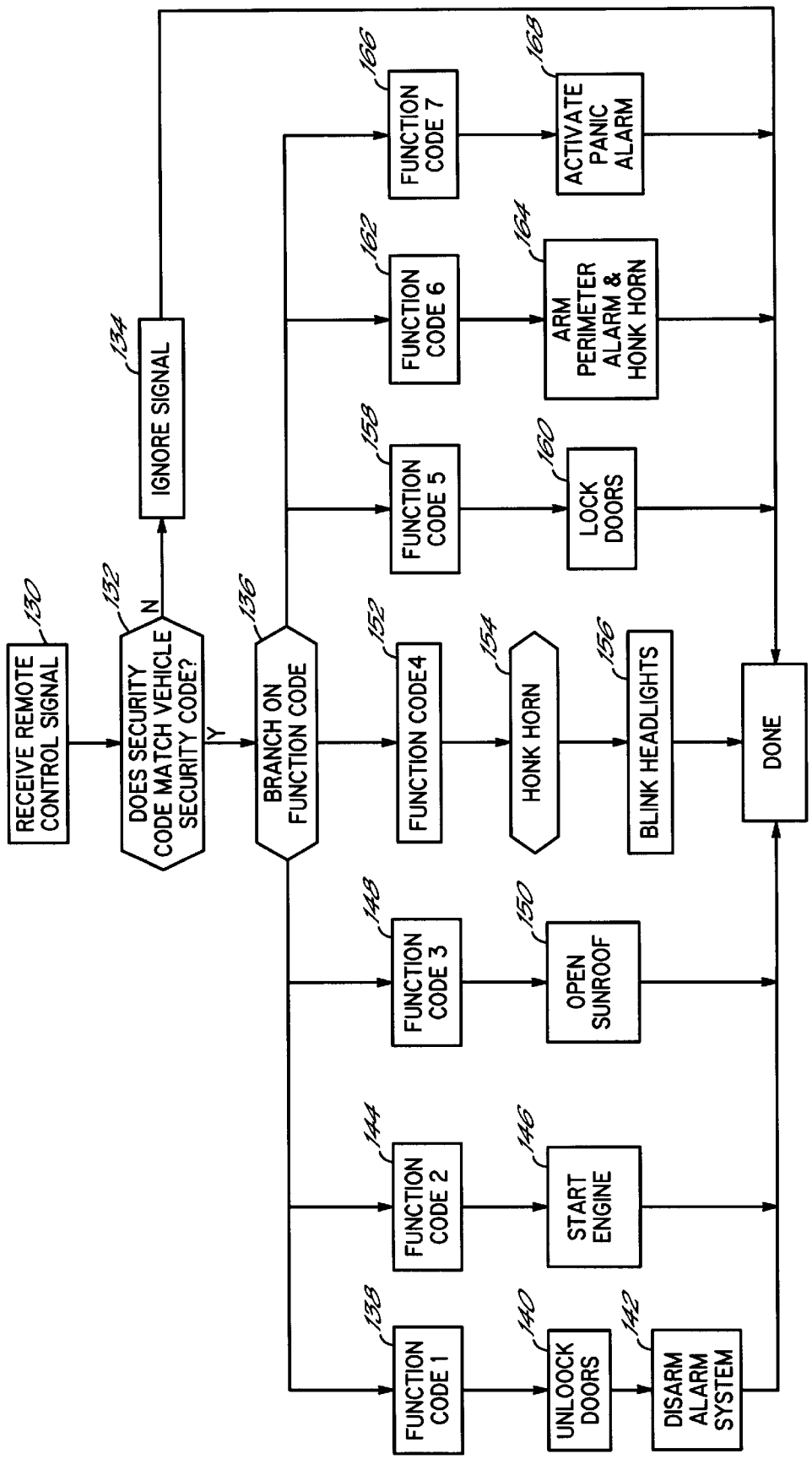
FIG. 3C is a flow chart of operations performed by the receiver of the remote control system of FIG. 2 in response to receipt of a wireless remote control signal, in accordance with a second embodiment of the present invention.

Referring now to FIG. 3C, the operations of control circuit 56 in activating the various vehicle systems shown in FIG. 2, in accordance with the second aspect of the present invention, are illustrated in more detail. Upon receipt 130 of a valid remote control signal, control circuit 56 initially determines 132 whether the security code in the received signal matches the security code of the vehicle. The vehicle security code may be programmed into control circuit 56 via a memory device or by switches selectable by the user.

If the transmitted signal's security code does not match the vehicle's security code, then the signal is ignored 134. If, however, the security code matches, then the function code in the transmitted signal is evaluated 136 to determine the appropriate action to take. If the function code has a first value 138, then the control circuit 56 unlocks 140 the vehicle doors and disarms 142 the vehicle's alarm system. If the function code has a second value 144, then control circuit 56 starts 146 the vehicle's engine. If the function code has a third value 148, then the control circuit 56 activates the door lock system 60 to open 150 the vehicle's sunroof. If the function code has a fourth value 152, then control circuit 56 causes the alarm circuit 66 to signal the vehicle's location by honking 154 the vehicle's horn and blinking 156 the vehicle's headlights. If the function code has a fifth value 158, then the control circuit 56 activates the door lock system 58 to lock 160 the vehicle's doors. If the function code has a sixth value 162, then control circuit 56 causes the alarm system 66 to arm 164 the vehicle's perimeter alarm system, and honk the horn to confirm arming of the alarm system. If the function code has a seventh value 166, then the control circuit 56 activates 168 the alarm system 66 in a "panic" mode.

Figure 3D:
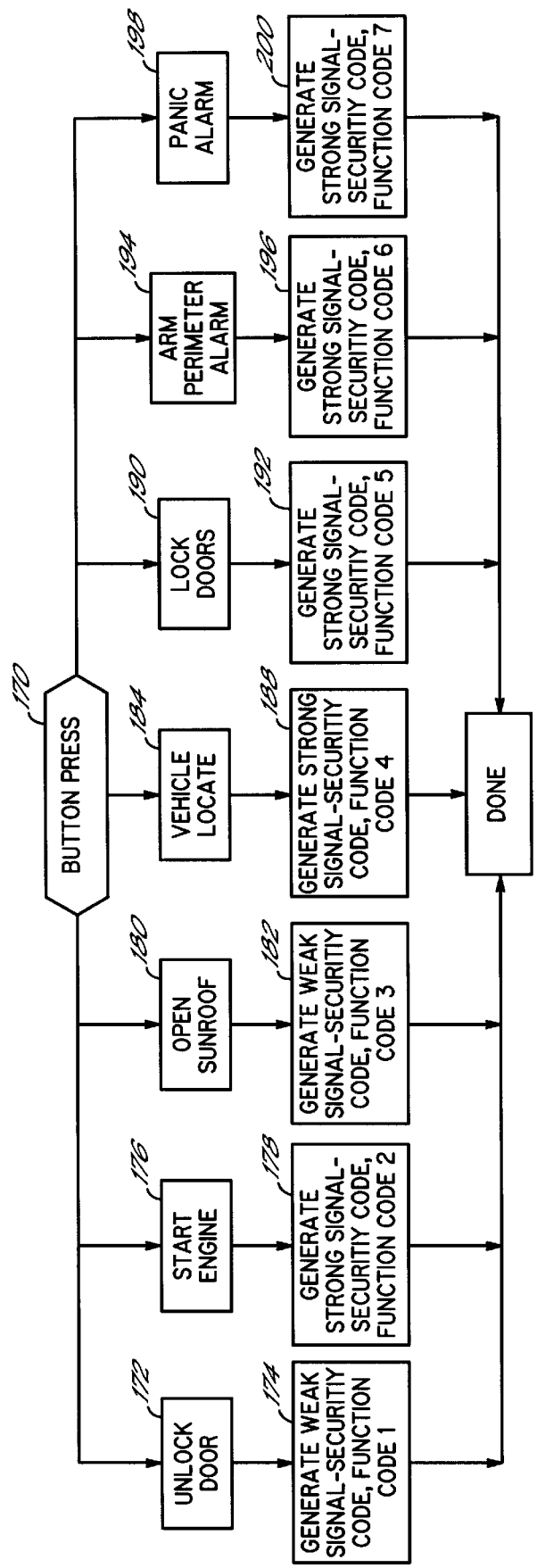
FIG. 3D is a flow chart of operations performed by the transmitter of the remote control system of FIG. 2 generating a wireless remote control signal in accordance with the second embodiment of the present invention.

Referring now to FIG. 3D, in accordance with this second aspect of the invention, the remote control transmitter 20 generates transmitted signals of varying strength depending upon the function activated by keypad 36. Thus, when a button is pressed 170, the transmitter 20 determines which button was pressed and takes the appropriate action.

If the unlock doors button was pressed 172, then a weak signal is generated 174 including the vehicle security code and the first function code value. If transmitter 20 is distant from the vehicle when this button is pressed, then the signal received at the receiver 22 will be so weak as to be identified as invalid by signal strength detector 52, and the signal will be ignored. Only if transmitter 20 is near to the vehicle 10 will the signal be considered valid when received by receiver 22, causing vehicle 10 to unlock its doors.

If the start engine button was pressed 176, then a strong signal is generated 178 which includes the vehicle security code and the second function code value. Even if transmitter 20 is distant from the vehicle when this button is pressed, when this signal is received at the vehicle 10, it will be considered valid and vehicle 10 will start its engine upon receipt of the signal.

If the open sunroof button was pressed 180, then a weak signal is generated 182 which includes the vehicle security code and the third function code value. If transmitter 20 is distant from the vehicle when this button is pressed, then the signal received at the receiver 22 will be so weak as to be identified as invalid by signal strength detector 52, and the ignored. Only if transmitter 20 is near to the vehicle 10 will the signal be considered value when received by receiver 22 and cause vehicle 10 to open its sunroof.

If the vehicle locate button is pressed 184, then a strong signal is generated 188 which includes the vehicle security code and the fourth function code value. Even if transmitter 20 is distant from the vehicle when this button is pressed, when this signal is received at the vehicle 10, it will be considered valid and the vehicle 10 will honk its horn and flash its headlights upon receipt of this signal.

If the lock doors button was pressed 190, then a strong signal is generated 192 which includes the vehicle security code and the fifth function code value. Even if transmitter 20 is distant from the vehicle when this button is pressed, when this signal is received at the vehicle 10, it will be considered valid and the vehicle 10 will lock its doors upon receipt of this signal.

If the arm alarm button was pressed 194, then a strong signal is generated 196 which includes the vehicle security code and the sixth function code value. Even if transmitter 20 is distant from the vehicle when this button is pressed, when this signal is received at the vehicle 10, it will be considered valid and the vehicle 10 will arm its alarm system 66 in response to this signal.

If the panic alarm button was pressed 198, then a strong signal is generated 200 which includes the vehicle security code and the seventh function code value. Even if transmitter 20 is distant from the vehicle when this button is pressed, when this signal is received at the vehicle 10, it will be considered valid and the vehicle 10 will sound a panic alarm.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A remote control system for activating at least a first function of a vehicle, the remote control system comprising:
    a transmitter for generating and transmitting a wireless remote control signal,
    a receiver for receiving the wireless remote control signal, the receiver comprising a signal strength evaluation circuit for identifying the received wireless remote control signal as a valid signal of a minimum strength, and further discriminating between a stronger valid signal or a weaker valid signal,
    a control circuit responsive to the strength evaluation circuit for activating the first function of the vehicle, the control circuit activating the first vehicle function upon detection of a stronger valid signal but not activating the first function upon detection of a weaker valid signal.

2. The remote control system of claim 1 adapted for activating a second function of the vehicle, wherein the control circuit is responsive to the strength evaluation circuit for activating the second function of the vehicle upon detection of a weaker valid signal but not activating the second function upon detection of a stronger valid signal.

3. The remote control system of claim 2 wherein the first and second vehicle functions comprise one or more of:
    locking or unlocking vehicle doors,
    starting the vehicle's engine,
    arming or disarming the vehicle's alarm system,
    activating a panic alarm,
    generating a signal to aid in locating the vehicle, or
    activating electrically powered features of the vehicle.

4. The remote control system of claim 3 wherein the signal to aid in locating the vehicle comprises illuminating lights on the vehicle or honking the vehicle's horn.

5. The remote control system of claim 3 wherein activating an electrically powered feature of the vehicle comprises opening the vehicle's windows or sunroof.

6. The remote control system of claim 3 wherein the first vehicle function comprises generating a signal to aid in locating the vehicle, and the second vehicle function comprises opening the vehicle's sunroof.

7. The remote control system of claim 3 wherein the first vehicle function comprises arming the vehicle's alarm system and the second vehicle function comprises locking the vehicle's doors.

8. The remote control system of claim 3 wherein the first vehicle function comprises starting the vehicle's engine and the second vehicle function comprises unlocking a vehicle door.

9. The remote control system of claim 8 wherein the second vehicle function further comprises disarming the vehicle alarm system.

10. The remote control system of claim 1 wherein the wireless remote control signal comprises one or more modulated codes, and the receiver comprises a decoder for evaluating the codes in the control signal, the control circuit being responsive to the decoder in determining whether a valid signal was received to activate a particular vehicle function.

11. The remote control system of claim 10 wherein
    the code transmitted with the wireless remote control signal comprises a function code, the decoder delivers the function code transmitted with the wireless remote control signal to the control circuit, and the control circuit activates the first or second vehicle function, based upon a signal strength of a valid signal identified by the signal strength circuit, upon a match of the function code delivered from the decoder to a function code associated with the first or second vehicle function.

12. The remote control system of claim 11 wherein the control circuit activates a third vehicle function upon a match of the function code delivered from the decoder to a function code associated with the third vehicle function.

13. The remote control system of claim 11 wherein the control circuit activates a third or a fourth vehicle function, based upon a signal strength of a valid signal identified by the signal strength circuit, upon a match of the function code delivered from the decoder to the function code associated with the third or fourth vehicle function.

14. The remote control system of claim 10 wherein the code transmitted with the wireless remote control signal comprises a security code, the decoder delivers the security code transmitted with the wireless remote control signal to the control circuit, the control circuit determines that a valid signal was received upon a match of the code delivered from the decoder to a security code associated with the vehicle.

15. The remote control system of claim 14 wherein the code transmitted with the wireless remote control signal further comprises a function code, the decoder delivers the function code transmitted with the wireless remote control signal to the control circuit, the control circuit activates the first or second vehicle function, based upon a signal strength identified by the signal strength circuit, upon a match of the function code delivered from the decoder to a function code associated with the first or second vehicle function.

16. The remote control system of claim 15 wherein the control circuit activates a third vehicle function upon a match of the function code delivered from the decoder to a function code associated with the third vehicle function.

17. The remote control system of claim 15 wherein the control circuit activates a third or a fourth vehicle function, based upon a signal strength of a valid signal identified by the signal strength circuit, upon a match of the function code delivered from the decoder to the function code associated with the third or fourth vehicle function.

18. A remote control system for activating at least a first and a second function of a vehicle, where the first function is to be activated a relatively large distance from the vehicle, but the second function is to be activated only a relatively small distance from the vehicle, the remote control system comprising:

a transmitter for generating and transmitting a wireless remote control signal, the transmitter generating a first stronger signal to activate the first function and generating a second weaker signal to activate the second function, a receiver for receiving the wireless remote control signal, the receiver comprising a signal strength evaluation circuit for identifying the received wireless remote control signal as a valid signal of at least a minimum strength, a control circuit responsive to the strength evaluation circuit for activating the first function of the vehicle upon receipt of a valid first stronger signal from the transmitter, and activating the second function of the vehicle upon receipt of a valid second weaker signal from the transmitter.

19. The remote control system of claim 18 wherein the first and second vehicle functions comprise one or more of:

locking or unlocking vehicle doors, starting the vehicle's engine, arming or disarming the vehicle's alarm system, activating a panic alarm, generating a signal to aid in locating the vehicle, or activating electrically powered features of the vehicle.

20. The remote control system of claim 19 wherein the signal to aid in locating the vehicle comprises illuminating lights on the vehicle or honking the vehicle's horn.

21. The remote control system of claim 19 wherein activating an electrically powered feature of the vehicle comprises opening the vehicle's windows or sunroof.

22. The remote control system of claim 19 wherein the first vehicle function comprises generating a signal to aid in locating the vehicle, and the second vehicle function comprises opening the vehicle's sunroof.

23. The remote control system of claim 19 wherein the first vehicle function comprises arming the vehicle's alarm system and the second vehicle function comprises locking the vehicle's doors.

24. The remote control system of claim 19 wherein the first vehicle function comprises starting the vehicle's engine and the second vehicle function comprises unlocking a vehicle door.

25. The remote control system of claim 24 wherein the second vehicle function further comprises disarming the vehicle alarm system.

26. The remote control system of claim 18 wherein the wireless remote control signal comprises one or more modulated codes, and the receiver comprises a decoder for evaluating the codes in the control signal, the control circuit being responsive to the decoder in determining whether a valid signal was received to activate a particular vehicle function.

27. The remote control system of claim 26 wherein the code transmitted with the wireless remote control signal comprises a function code, the decoder delivers the function code transmitted with the wireless remote control signal to the control circuit, and the control circuit activates the first or second vehicle function, when a valid signal is identified by the signal strength circuit, upon a match of the function code delivered from the decoder to a function code associated with the first or second vehicle function.

28. The remote control system of claim 27 wherein the control circuit activates a third vehicle function upon a match of the function code delivered from the decoder to a function code associated with the third vehicle function.

29. The remote control system of claim 27 wherein the control circuit activates a third or a fourth vehicle function, when a valid signal is identified by the signal strength circuit, upon a match of the function code delivered from the decoder to the function code associated with the third or fourth vehicle function.

30. The remote control system of claim 26 wherein the code transmitted with the wireless remote control signal comprises a security code, the decoder delivers the security code transmitted with the wireless remote control signal to the control circuit, the control circuit determines that a valid signal was received upon a match of the code delivered from the decoder to a security code associated with the vehicle.

31. The remote control system of claim 30 wherein the code transmitted with the wireless remote control signal further comprises a function code, the decoder delivers the function code transmitted with the wireless remote control signal to the control circuit, the control circuit activates the first or second vehicle function, when a valid signal is identified by the signal strength circuit, upon a match of the function code delivered from the decoder to a function code associated with the first or second vehicle function.

32. The remote control system of claim 31 wherein the control circuit activates a third vehicle function upon a match of the function code delivered from the decoder to a function code associated with the third vehicle function.

33. The remote control system of claim 31 wherein the control circuit activates a third or a fourth vehicle function, when a valid signal is identified by the signal strength circuit, upon a match of the function code delivered from the decoder to the function code associated with the third or fourth vehicle function.

* * * * *